United States Patent
Schmidt et al.

(10) Patent No.: US 6,398,307 B1
(45) Date of Patent: Jun. 4, 2002

(54) VEHICLE SEAT

(75) Inventors: Bernd Schmidt, Wildberg; Ralf-Henning Schrom, Rottenburg; Volkmar Schulz, Weitransdorf, all of (DE); Philip C. Shephard, Birmingham (GB)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/520,973

(22) Filed: Mar. 8, 2000

(30) Foreign Application Priority Data

Mar. 8, 1999 (DE) ............................... 199 10 081

(51) Int. Cl.⁷ .............................................. A47C 1/032
(52) U.S. Cl. .................. 297/344.17; 297/337
(58) Field of Search ...................... 297/337, 344.12, 297/344.13, 313, 344.14, 344.15, 344.17, 311, 284.1; 248/419, 420, 429

(56) References Cited

U.S. PATENT DOCUMENTS 4,687,251 A * 8/1987 Kazaoka et al.
4,765,582 A * 8/1988 Babbs
5,145,232 A * 9/1992 Dal Monte
5,553,920 A * 9/1996 Meschkat et al.
5,692,802 A * 12/1997 Aufrere et al.

FOREIGN PATENT DOCUMENTS

| DE | 42 24 458 A1 | 1/1994 |
| DE | 197 15 626 A1 | 1/1998 |
| DE | 197 16 596 A1 | 10/1998 |

* cited by examiner

Primary Examiner—Milton Nelson, Jr.
(74) Attorney, Agent, or Firm—Crowell & Moring, LLP

(57) ABSTRACT

A vehicle seat has a seat frame which is arranged in a vertically adjustable manner above a seat underframe. A backrest part is mounted on the seat frame, and a seat cushion carrying part, for adjusting the seat cushion depth, is displaceably disposed by an end area in two guides. The other end area of the seat cushion carrying part is supported by two additional guides. The additional guides are supported by way of a supporting construction past the seat frame directly on the seat underframe.

10 Claims, 3 Drawing Sheets

VEHICLE SEAT

This application claims the priority of German application 199 10 081.0, filed Mar. 8, 1999, the disclosure of which is expressly incorporated by reference herein.

BACKGROUND AND SUMMARY OF THE INVENTION

The present invention relates to a vehicle seat having a seat frame which is arranged in a vertically adjustable manner above a seat underframe. The vehicle seat includes a seat frame which is arranged in a vertically adjustable manner above a seat underframe, a backrest part mounted on the seat frame, and a seat cushion carrying part which adjusts the seat cushion depth and is displaceably disposed by an end area in two guides. Another end area of the seat cushion carrying part is supported by two additional guides.

A vehicle seat of this type is revealed in German Patent Document DE 42 24 458 A1 and has a seat cushion carrying part. This seat cushion carrying part is displaceably movable for adjusting the seat cushion depth and is supported by way of four guides on the seat frame. When the vehicle seat is stressed by an occupant, the seat frame must absorb considerable forces. Very stable dimensioning and the use of correspondingly bending-resistant frame profiles are required, particularly in the event of an accident, when clearly higher forces are transmitted by the occupant to the vehicle seat.

It is an object of the invention to provide a vehicle seat with a seat frame which is arranged in a vertically adjustable manner above the seat underframe, which has smaller dimensions, and which ensures sufficient support of the seat cushion carrying part.

According to the invention, this object is achieved by a vehicle seat having additional guides which are supported by way of a supporting construction, while bypassing the seat frame, directly on the seat underframe.

In a vehicle seat according to the invention, the seat frame is clearly relieved by supporting an end area of the seat cushion carrying part directly at the seat underframe. The forward end section of the seat cushion carrying part, in particular, can be supported at the seat underframe. As a result, the frame profile of the seat frame may have smaller dimensions, and the height of the seat frame with the seat cushion carrying part can be reduced.

Advantageous embodiments of the vehicle seat according to the invention with expedient further developments of the invention are also claimed.

It was found to be particularly advantageous for the supporting construction to be moved with the seat frame when the vehicle seat is vertically adjusted. Thus, vertical adjustment of the seat frame which leads to one-sided lifting or lowering of the seat cushion carrying part is prevented. Both end sections of the seat cushion carrying part are instead lifted by approximately the same height.

In addition, it is particularly advantageous for the supporting construction to comprise an inclination adjusting device. Such a device permits the inclination of the seat cushion carrying part to be adjusted, and the sitting comfort for an occupant can therefore be increased. In this case, a frame rocker arranged on the transverse rod of the height adjusting device was found to be particularly advantageous as a stable support of the forward end area of the seat cushion carrying part.

Finally, it is advantageous to design the seat cushion carrying part to be displaceable with respect to the seat frame and the supporting construction and to be longitudinally movable by way of a spindle drive. The spindle drive can be fastened in a particularly space-saving manner on the underside of the seat cushion carrying part.

Additional advantages, characteristics and details of the invention will become apparent from the following description as well as from the drawings.

DETAILED DESCRIPTION OF THE DRAWINGS

Figure 1:
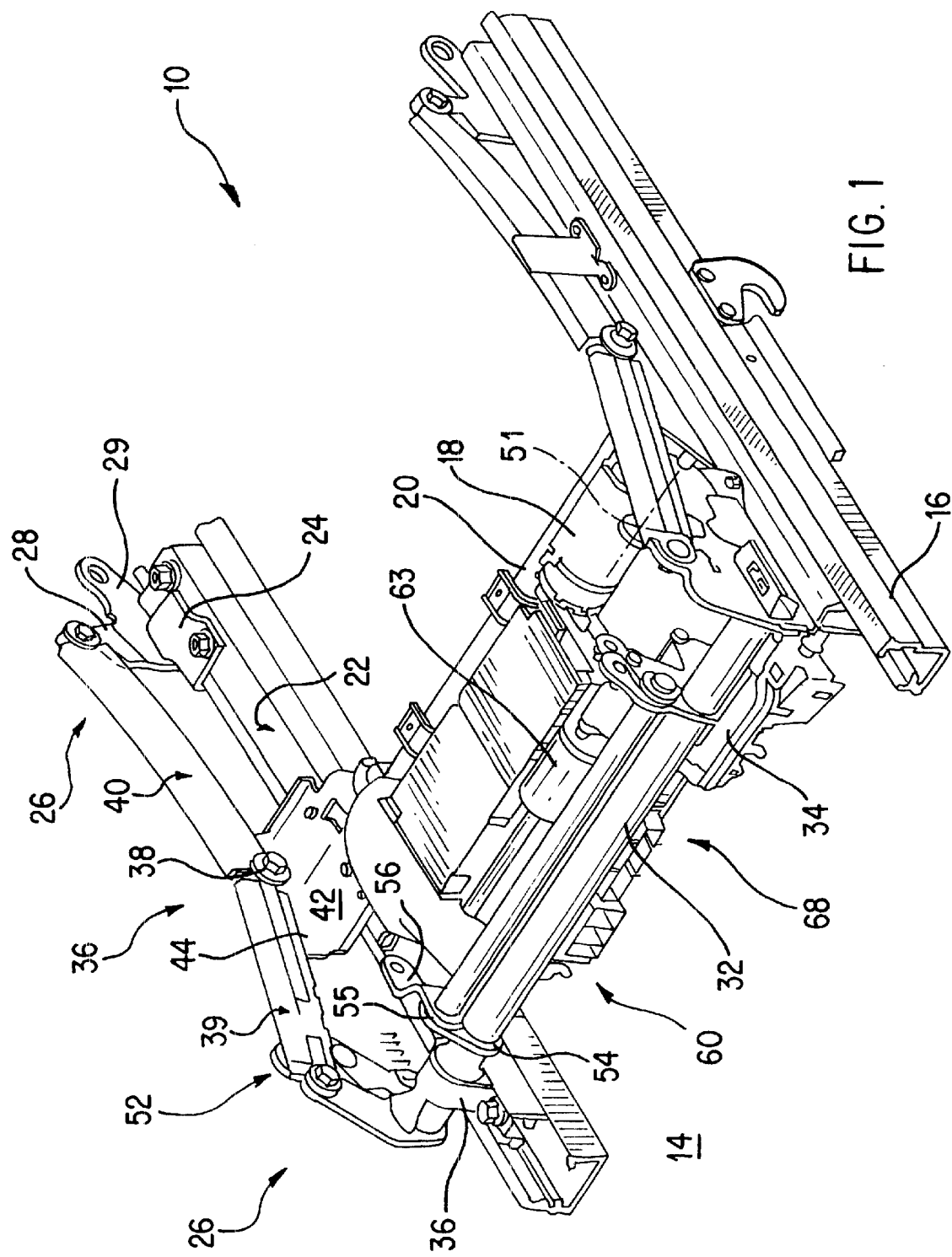
FIG. 1 is a perspective view of a seat underframe of the vehicle seat according to a preferred embodiment of the invention.
Figure 2:
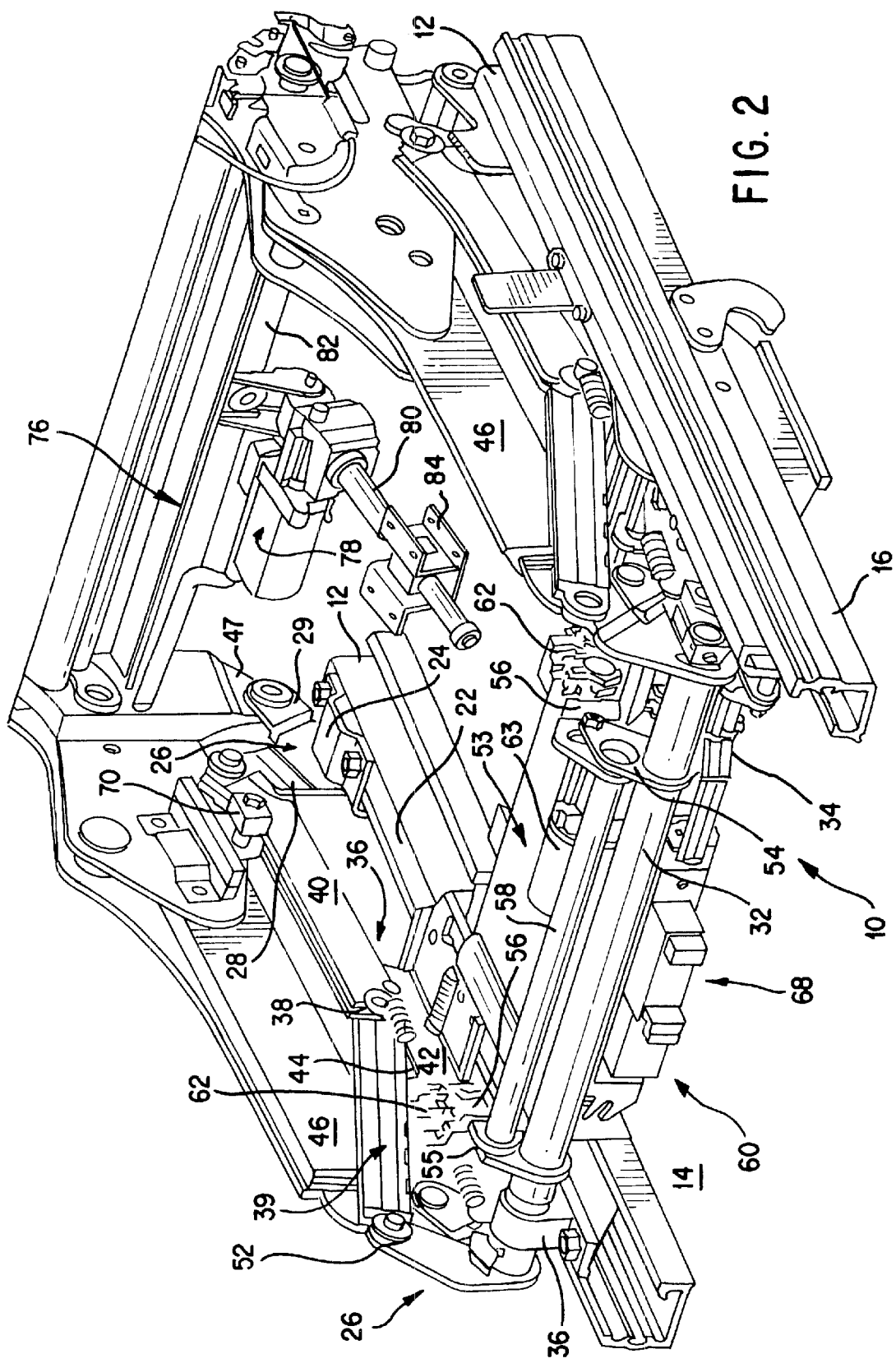
FIG. 2 is a perspective view of the seat underframe and of a seat frame of the vehicle seat arranged above the seat underframe according to a preferred embodiment of the invention.

FIGS. 1 and 2 are perspective views of a seat underframe 10 of a vehicle seat, with bearing rails 22 which, for longitudinally adjusting the vehicle seat, are guided in a longitudinally adjustable and lockable manner in two guide rails 16 which extend parallel to one another and are fastened on the vehicle floor 14. For this purpose, a shaft 20 is provided between the bearing rails 12. The shaft is to be driven by way of a geared motor 18 and is to be locked. The shaft is disposed on the bearing rails 12 and has ends on which hidden gears are fastened which engage with hidden toothed racks fastened on the guide rails 16.

In the rearward area of each of the bearing rails 12, one rearward bearing block 24, respectively, is fastened to its top side 22. On each of the rearward bearing blocks 24, one control lever 26, respectively, is swivellably disposed. Each control lever is respectively constructed approximately in a V-shape and with one forward control arm 28 and one rearward control arm 29. In the forward area of each bearing rail 12, a forward bearing block 36 is respectively fastened on its top side 22 by two screwed connections. In the forward bearing blocks 36, a transverse rod 32 is rotatably accommodated. On ends of the transverse rod, two control levers 26 are fastened, which have essentially the same design as the above-described rearward control levers 26. The transverse rod 32 can be rotated and locked by a geared motor 34 for vertical adjustment. This geared motor is fastened on the bearing rail 12 which is on the right when viewed from the front.

The respective forward control arms 28 of the mutually laterally assigned forward and rearward control levers 26 are connected with one another by way of one coupling rocker 36 respectively. The coupling rocker 36 comprises two coupling arms 39, 40 which are hinged to one another by an intermediate joint 38. The forward coupling arm 39 is linked to the respective forward control lever 26, and the rearward coupling arm 40 is linked to the respective rearward control lever 26. Approximately in the center of the two bearing rails 12, one essentially angular hinge guide 42, which has an approximately horizontally extending oblong hole 44, is respectively fastened on the top side 22 of the two bearing rails 12. In the oblong hole 44, the intermediate joint 38 is linearly displaceably guided and the coupling rocker 36 is supported on the assigned bearing rail 12 of the seat underframe 10.

Figure 3:
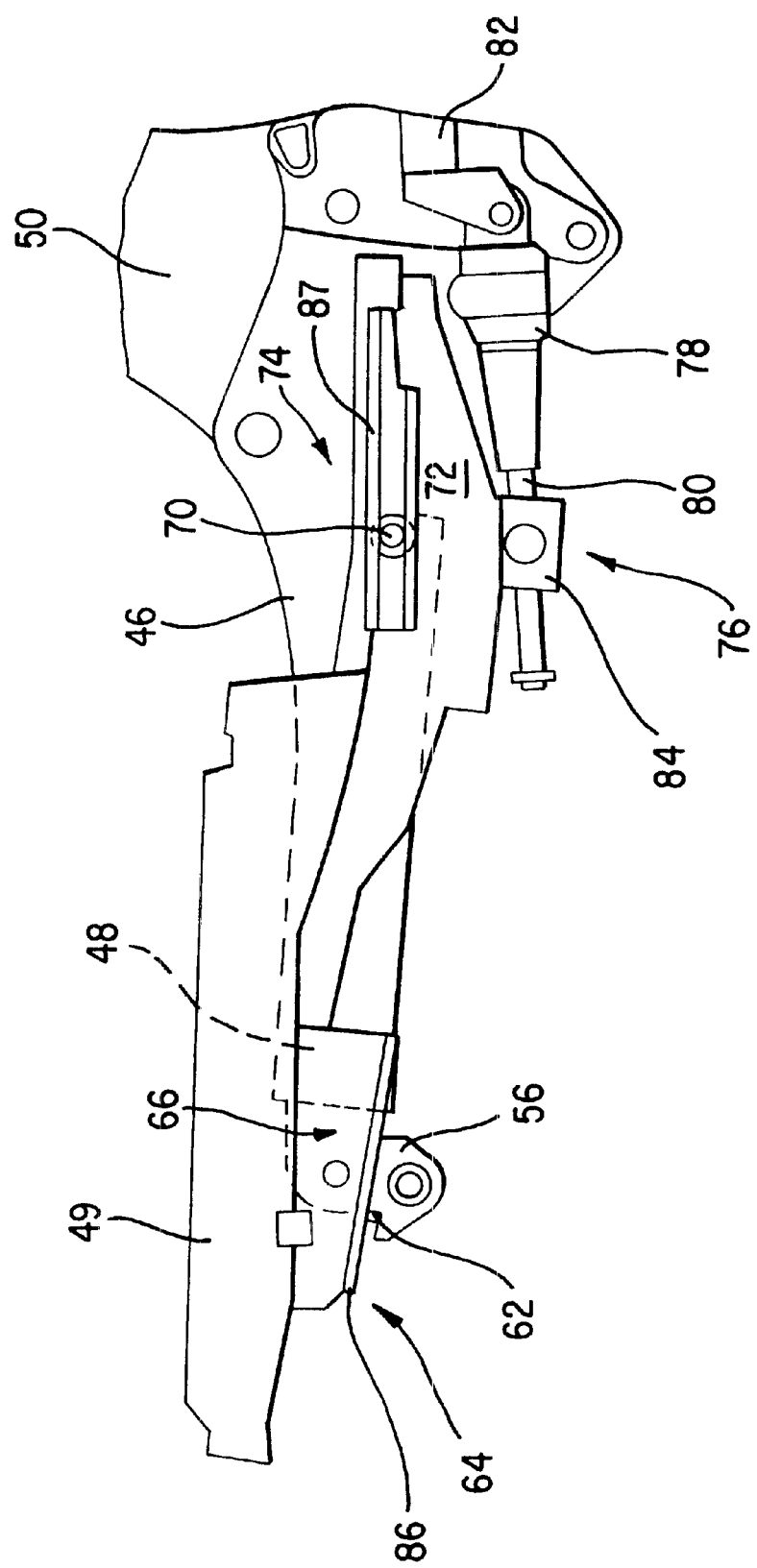
FIG. 3 is a schematic lateral view of the seat frame situate above the seat underframe and of a seat cushion carrying part which is displaceably movably arranged on the seat frame of the vehicle according to the invention.

In contrast to FIG. 1, FIG. 2 additionally shows a seat frame 46 of the vehicle seat which is approximately U-shaped in a top view and on which a seat cushion carrying part 48 (FIG. 3) as well as a backrest part 50 (FIG. 3) are arranged. In this case, the seat cushion carrying part 48 is constructed as a one-piece flat component for receiving a seat cushion 49 (FIG. 3). The rearward control levers 26 are hinged by way of their rearward control arms 29 to downward-projecting triangular receiving devices 47 of the seat frame 46. The forward control levers 26 are connected by their rearward control arms 29 by way of one compensation control arm 52 respectively with the forward end of the seat frame 46. In this case, the compensation control arm 52 is used particularly for compensating forces acting upon the seat frame 46.

In FIG. 1 as well as in FIG. 2, the vehicle seat is illustrated in its approximately deepest position. The intermediate joint 38 is situated approximately in its rearmost position in the oblong hole 44 of the hinge guide 42. For adjusting the vehicle seat into a higher position, the transverse rod 32, which is driven by the geared motor 34 and is to be locked, is correspondingly rotated counterclockwise. Consequently, the forward control levers 26 fixedly connected with the transverse rod 32 and, by way of the coupling rocker 36, the rearward control levers 26 as well are swivelled counterclockwise. In other words, the seat frame 46 is moved equally in the front and the rear upward or downward with respect to the seat underframe 10. At the finally adjusted height, the seat frame 46 is or the seat cushion carrying part 48 and the backrest part 50 are fixed by the geared motor 34 which is then locked.

As best illustrated in FIG. 1, the seat underframe 10 has an approximately U-shaped construction, with laterally arranged bearing rails 12, control levers 26, the coupling rockers 36 and the driving units extending transversely in the front, for the longitudinal, vertical and inclination adjustment of the seat cushion carrying part 48. As a result, a seat underframe 10 as a whole is achieved which offers a large foot space for a person sitting behind the vehicle seat.

Two receiving devices 54, which are non-rotatably connected with the transverse rod 32 and are assigned to an inclination adjusting device 53 of the seat cushion carrying part 48, project from the transverse rod 32. At the ends 55 of the receiving devices 54, one intermediate control arm 56, respectively, is swivellably arranged. For this purpose, the two intermediate control arms 56 are rotationally coupled by way of another transverse rod 58 which is fixedly connected with the two intermediate control arms 56. The additional transverse rod 58 are rotatably disposed on the receiving devices 54. The transverse rod 32, the additional transverse rod 58 and the two receiving devices 54, therefore, as a whole, form an approximately rectangular frame rocker 60 which, during a vertical adjustment of the seat frame 46, is correspondingly rotated along about the transverse rod 32. The two intermediate control arms 56 are mirror-symmetrically bent to the outside at right angles and can be swivelled by way of a common geared motor 63 with respect to the receiving devices 54 and the transverse rod 32 and can be locked.

The geared motor 63 is fixedly arranged on the receiving device 54 which is on the right when viewed from the front. For this purpose, the right intermediate control arm 56 has a circular-arc-shaped toothed rack which is not shown and which meshes with a pinion, which is also not shown, of the geared motor 63. In each case, at their ends which face away from the additional transverse rod 58, forward guiding devices 62 are linked to the intermediate control arms 56 and are arranged laterally inside the seat frame 46. The guiding devices 62 engage in guides 64 (FIG. 3) on the seat cushion carrying part 48. These guiding devices are used, on the one hand, for supporting the forward end area 66 (FIG. 3) of the seat cushion carrying part 48 as well as for its inclination adjustment and, on the other hand, for guiding the longitudinally displaceable seat carrying part 48 as will be explained in detail in the following. On the whole, the transverse rod 32 arranged on the bearing rails 12, the frame rocker 60 and the intermediate control arms 56 provide a supporting construction 68. By way of this supporting construction, the guiding devices 62 swivellably disposed on the intermediate control arms 56 or the forward end area 66 of the seat cushion carrying part 48 are supported past the seat frame 46 directly on the seat underframe 10. The supporting construction 68 and the inclination adjusting device 53 are moved by way of the transverse rod 32 during vertical adjustment of the seat frame 46 together with the seat frame 46. The receiving devices 54 are fastened on the transverse rod 32 in such a manner, and the intermediate control arms 56 are further developed such that the forward guiding devices 62 are situated approximately in the area of a line which would have to be constructed by the connection of the axes of the hinge points 51 between the compensation control arms 52 and the forward end of the seat frame 46. In other words, this further development of the receiving devices 54 and of the intermediate control arms 56 causes the inclination adjustment of the seat cushion carrying part 48 to remain approximately the same independently of the of the height adjustment of the seat frame 46. The inclination adjustment of the seat cushion part 48, therefore, takes place almost exclusively by swivelling of the intermediate control arms 56.

Laterally on the rearward end of the seat frame 46, two rearward guiding devices 70 are hinged to the seat frame 46 on which the seat cushion carrying part 48 is displaceably movably disposed by way of a rearward end area 72 (FIG. 3) in two rearward guides 74. On the whole, for the seat cushion depth adjustment, the seat cushion carrying part 48 is therefore displaceably disposed by way of four guides 64, 74. The seat cushion carrying part 48, by way of the guiding devices 70 assigned to the rearward guide 74, is supported on the seat frame 46 and, by way of the guiding devices 62 assigned to the forward guide 64, is supported on the seat underframe 10.

As illustrated in FIGS. 2 and 3, the seat cushion carrying part 48 is longitudinally movable with respect to the seat frame 46 and the supporting construction 68 by way of a spindle drive 76 and can be locked. The spindle drive 76 comprises a driving spindle 80 which can be rotated by a geared motor 78 as illustrated in FIG. 3. These two components are mounted in a hinged manner close to the underside of the rearward end area 72 of the seat cushion carrying part 48 on a transverse profile 82 of the seat frame 46. The driving motor 78 is arranged approximately at a right angle with respect to the driving spindle 80 extending in the longitudinal direction of the vehicle. A threaded sleeve 84 moves on the driving spindle 80 and is fastened to the underside of the seat cushion carrying part 48. As a result of the hinged arrangement of the constructional unit of the driving spindle 80 and the driving motor 78 on the transverse profile 82 of the seat frame 46, movement of the threaded sleeve 84—independently of the inclination adjustment of the seat cushion carrying part 48—on the driving spindle 80 is made free of distortion.

FIG. 3 illustrates, in addition to the arrangement of the spindle drive 76 below the seat cushion carrying part 48, particularly the forward and rearward guides 64, 74, the forward and rearward guiding devices 62, 70 as being able to engage in a roller-bearing-supported manner as well as a slide-bearing-supported manner in the assigned longitudinal rails 86, 87 at the forward and rearward end area 66 72 of the seat cushion carrying part 48. The spindle drive 76 is arranged at a sufficient height above the seat underframe 10 at the seat frame 46 that it does not impair the foot space for a rear passenger.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. Vehicle seat comprising:
   a seat frame which is arranged in a vertically adjustable manner above a seat underframe,
   a backrest part mounted on the seat frame, and
   a seat cushion carrying part which adjusts the seat cushion depth and is displaceably disposed by an end area in two guides, another end area of the seat cushion carrying part being supported by way of two additional guides,
   wherein the additional guides are supported by a supporting construction, while bypassing the seat frame, directly on the seat underframe.

2. Vehicle seat according to claim 1, wherein, during vertical adjustment of the vehicle seat, the supporting construction is moved with the seat frame.

3. Vehicle seat according to claim 1, wherein the supporting construction is arranged in the forward end area of the seat cushion carrying part and comprises an inclination adjusting device by which an inclination of the seat cushion carrying part can be adjusted relative to the seat frame.

4. Vehicle seat according to claim 1, wherein, for vertical adjustment of the vehicle seat, movement of the seat frame is controlled on both sides by control levers arranged in a parallelogram-type manner, forward control levers being rotationally coupled by way of a transverse rod, and two receiving devices, which are non-rotatably connected with the transverse rod, projecting from the transverse rod, the ends of the receiving devices being supported by way of one intermediate control arm respectively on the assigned guide of the forward end area.

5. Vehicle seat according to claim 4, wherein the receiving devices are connected with one another by way of an additional transverse rod, whereby the transverse rod, the additional transverse rod and the receiving devices form a rectangular frame rocker.

6. Vehicle seat according to claim 5, wherein the intermediate control arms are rotationally coupled by way of the additional transverse rod and wherein a driving motor is fastened to the frame rocker so that the intermediate control arms can be swivelled relative to the receiving devices.

7. Vehicle seat according to claim 4, wherein the intermediate control arms have a mirror-symmetrical construction and are bent outside at right angles.

8. Vehicle seat according to claim 1, wherein the seat cushion carrying part is displaceable with respect to the seat frame and the supporting construction and is longitudinally movable by a spindle drive.

9. Vehicle seat according to claim 8 and further comprising a threaded sleeve which moves on a driving spindle which can be rotated by a motor, said threaded sleeve being fastened on the underside of the seat cushion carrying part.

10. Vehicle seat and driving motor combination comprising:
    a seat frame which is arranged in a vertically adjustable manner above a seat underframe,
    a backrest part mounted on the seat frame, and
    a seat cushion carrying part which adjusts the seat cushion depth and is displaceably disposed by an end area in two guides, another end area of the seat cushion carrying part being supported by way of two additional guides, and
    a threaded sleeve which moves on a driving spindle which can be rotated by a motor, said threaded sleeve being fastened on the underside of the seat cushion carrying part,
    wherein the additional guides are supported by a supporting construction, while bypassing the seat frame, directly on the seat underframe,
    wherein the seat cushion carrying part is displaceable with respect to the seat frame and the supporting construction and is longitudinally movable by a spindle drive, and
    wherein the driving motor and the driving spindle are mounted close to the underside of the rearward end area of the seat cushion carrying part, and the driving motor is arranged approximately at a right angle with respect to the driving spindle.

* * * * *